Figure 1:
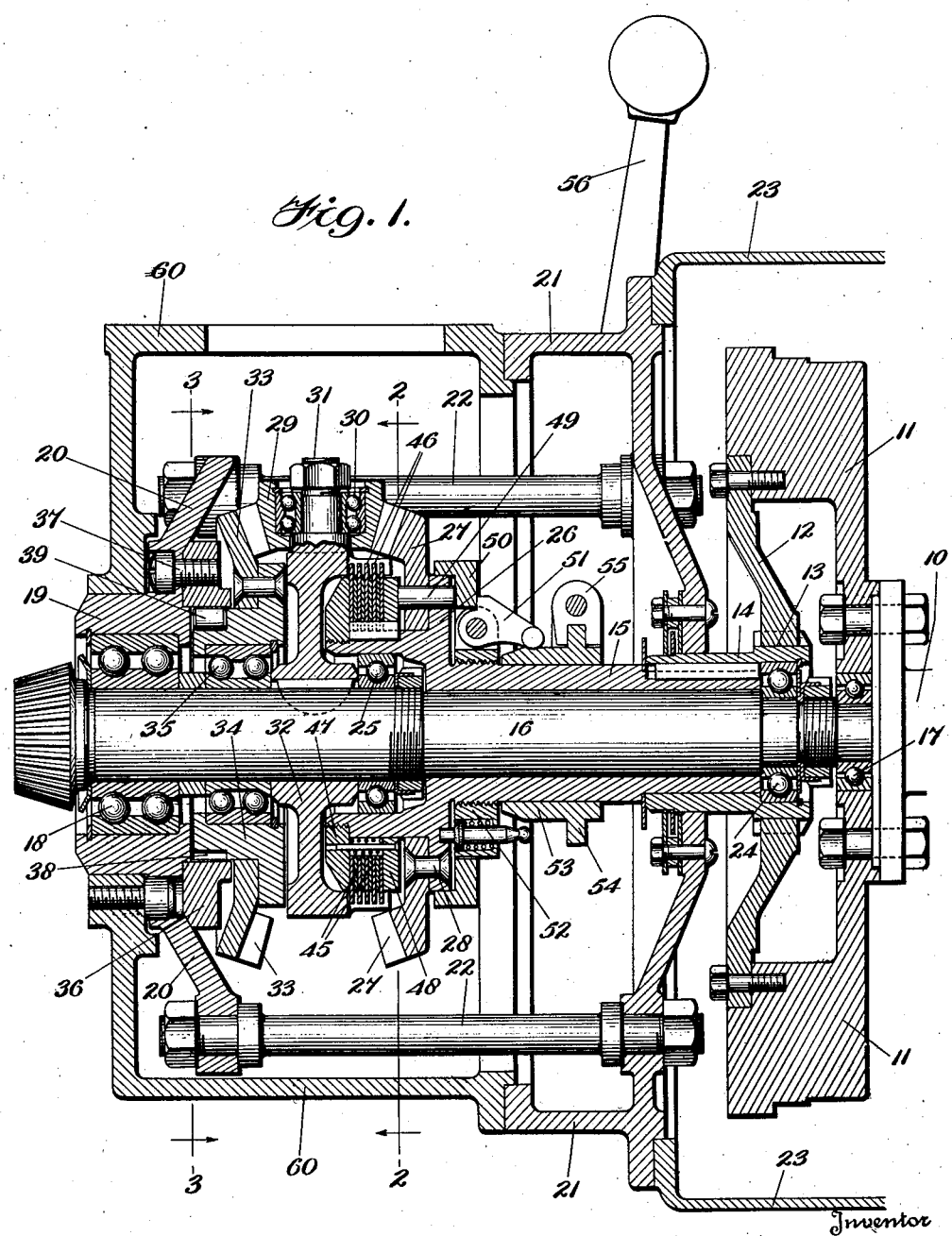

May 28, 1940.  H. A. HANSON  2,202,794
CHANGE-SPEED POWER TRANSMISSION GEARING
Filed March 14, 1939  2 Sheets-Sheet 1

Inventor
Hans A. Hanson,
By
Attorney

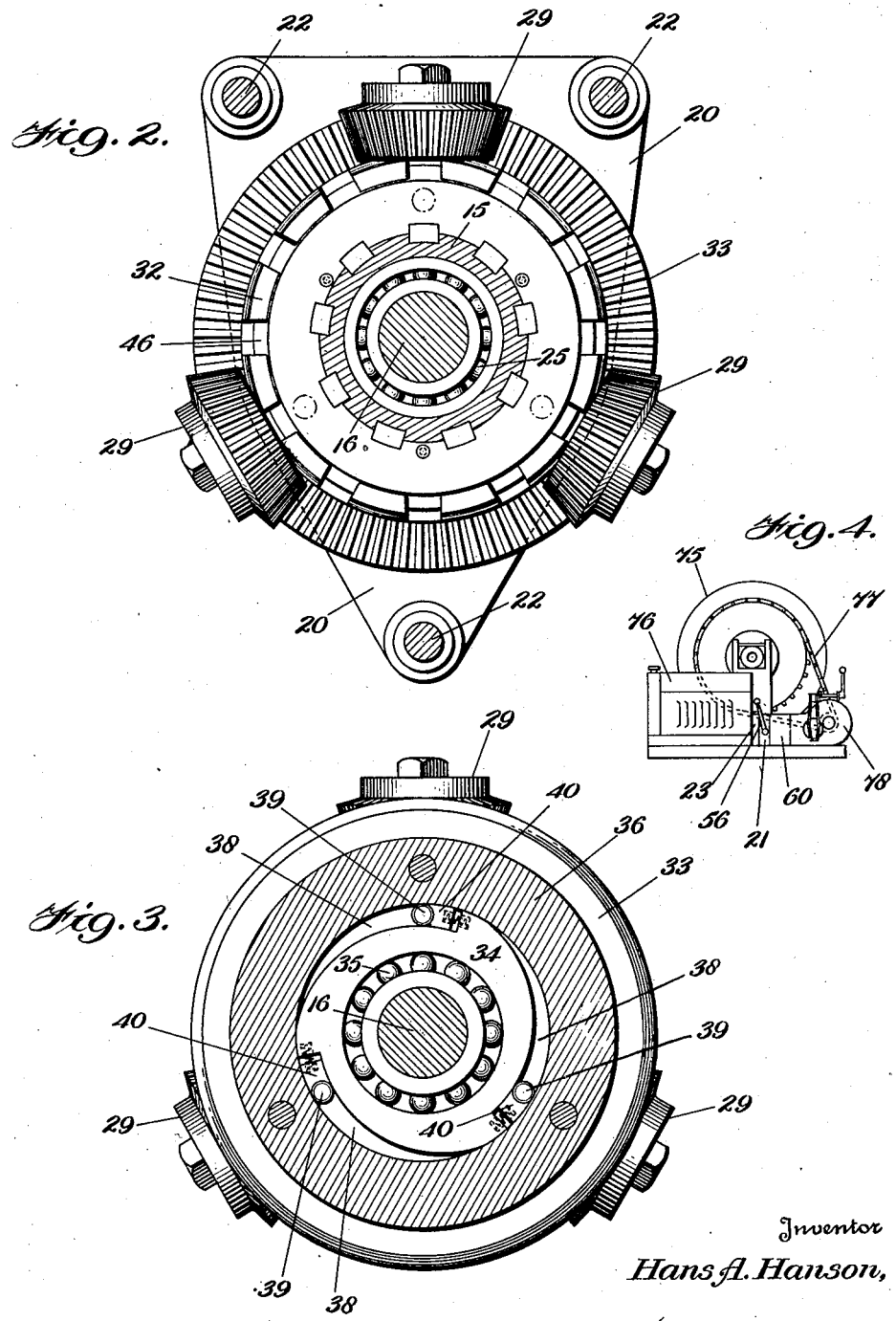

Patented May 28, 1940

2,202,794

UNITED STATES PATENT OFFICE 2,202,794

CHANGE-SPEED POWER TRANSMISSION GEARING

Hans A. Hanson, Milwaukee, Wis., assignor to Chain Belt Company, Milwaukee, Wis., a corporation of Wisconsin Application March 14, 1939, Serial No. 261,811

3 Claims. (Cl. 74—288)

The invention relates to change-speed power transmission gearing, and has for one of its objects to provide an apparatus of this character in which a plurality of forward speeds may be obtained with the gears constantly in mesh and without any break in the application of power during the change from one speed to another.

While the present gearing may be employed in a wide variety of applications, it is particularly well adapted for use in transmitting power to apparatus in which the load is of such a nature that there is substantially no coasting thereof upon cessation of the application of power thereto. Concrete mixers of the type shown in the prior U. S. Patent to Charles F. Ball, No. 1,781,965, dated November 18, 1930, and concrete pumps of the type shown in the U. S. Patents No. 2,017,975, dated October 22, 1935, to Jacobus C. Kooyman, and No. 2,062,200, dated November 24, 1936, to Charles F. Ball, may be cited as illustrative examples of apparatus of this type. In such concrete mixers the drum, loaded with from one to four or more cubic yards of concrete making materials, will come to rest almost immediately upon any break in the application of power thereto; and in the pumps referred to there is substantially no movement or coasting of the piston when application of the power thereto ceases.

It has been heretofore proposed to equip truck concrete mixers with change-speed gearing of the sliding gear or jaw clutch type, but in this type of gearing, during a shift from one speed to another there is an interval when the gears are out of mesh or the clutch jaws are out of driving engagement, in which interval the drum may come to a full stop. As a result, when shifting from a low to a high speed, the motor has had to pick up the full load at high speed from a dead stop. Since practically all truck mixers are now driven by independent motors rather than through power take-offs from the truck motor, this has necessitated the use of an independent motor sufficiently large and powerful to be able to start from complete rest an unbalanced drum load of perhaps ten or twelve tons. It will be understood that after the drum is once set to rotating, the load torque on the motor will decrease.

The transmission gearing constituting the present invention comprises essentially a pair of bevel gears in constant mesh with one or more bevel pinions carried by the driven shaft, a friction clutch, and a one-way or over-running brake; the arrangement being such that in low speed, with the friction clutch disengaged, the one-way brake acts to hold one of the bevel gears stationary whereby the other gear may drive the pinions about it as a track at a reduced speed, which of course is the speed of the driven shaft at the time. The friction clutch serves as a means for establishing a direct or high speed drive between the drive and driven shafts, and when it is engaged the one-way brake permits the track gear to rotate with the pinions and the other gear as a unit. All of the gears are always in mesh, and the change from one speed to the other is accomplished solely through the engagement or disengagement of the friction clutch. There is never any time at which power is not being applied to the driven element, and consequently in a mixer, pump or other apparatus of the non-coasting load type the motor is not forced to pick up the full load in high speed from a dead stop. As a result, it is possible to employ a smaller motor, i. e., one capable of picking up the load from a full stop in low gear, with a consequent saving in weight and initial and operating costs.

Referring to the accompanying drawings forming a part of this specification, illustrating one form of the present transmission gearing, in which like reference characters designate like parts in all the views:

Figure 1 is a central vertical sectional view through the transmission, showing the same associated with the fly-wheel of an internal combustion motor such as is commonly employed for driving a truck concrete mixer drum;

Figs. 2 and 3 are transverse sectional views, respectively taken approximately on the planes indicated by the lines 2—2 and 3—3 of Fig. 1, looking in the direction of the arrows; and Fig. 4 is a diagrammatic elevational view, illustrating the application of the transmission to a truck concrete mixer.

Referring more particularly to the said drawings, 10 indicates the drive shaft of the motor to which is secured the usual fly-wheel 11. The said fly-wheel is provided with a disc 12 having a splined connection 13 with a sleeve 14 which is keyed or otherwise rigidly secured to the hollow driving shaft 15. The driven shaft 16 extends through the drive shaft 15, as will be clear from Fig. 1, and one end thereof is journalled by an anti-friction bearing 17 mounted in the flywheel 11, while the other end of the said driven shaft is journalled by an anti-friction bearing 18 mounted in the hub 19 of a supporting plate 20. This plate, which is omitted in Fig. 3 but clearly shown in Figs. 1 and 2, is rigidly connected to and supported by a casing section 21 through the medium of the spacing bolts or rods 22, and the casing section 21 is secured to the flywheel housing 23 of the motor, as will be readily understood.

The hollow drive shaft 15 is journalled upon the anti-friction bearings 24 and 25, carried by the driven shaft 16, and the said drive shaft is provided with a flange 26 adjacent the bearing 25 to which flange a bevel driving gear 27 is rigidly secured by bolts or rivets 28. This gear is in constant mesh with one or more bevel pinions 29 which are journalled by anti-friction bearings 30 upon studs 31 projecting radially from the circumference of a spider 32 which is keyed or otherwise rigidly secured to the driven shaft 16.

A second bevel gear 33 is rigidly secured to a hub member 34 which is journalled upon the driven shaft 16 by an anti-friction bearing 35 and the said hub member 34 constitutes one element of a roller or ball one-way or overrunning brake, the other element of which is constituted by an annulus 36 which is rigidly secured to the plate member 20 by screws or bolts 37. As best shown in Fig. 3, the hub member 34 is provided with a plurality of tapering recesses 38 around its circumference, in each of which a ball or roller 39 is mounted, each of which rollers has a spring pressed follower 40 associated with it normally urging it toward the smaller end of its tapering recess 38. This is essentially a well known form of one-way or overrunning brake which permits free motion in one direction but automatically prevents it in the other.

The driving shaft 15 has splined to it one or more driving discs 45 of a friction clutch the driven discs 46 of which are splined to the spider 32 as will be clear from Figs. 1 and 2. Said shaft 15 carries an abutment ring 47 against which the said clutch discs may be pressed by a pressure ring 48 disposed at the opposite end of the clutch, which pressure ring is actuated by a plurality of pins 49 extending through the gear 27 and flange 26 and movable by an operating ring 50 which is actuated by a plurality of clutch fingers 51 pivotally mounted in a supporting ring or annulus 52 which is threaded upon the drive shaft 15. The fingers 51 are actuated by a cone sleeve 53 having an annular flange 54 which is engaged by a shifting yoke 55 which may be actuated by a hand lever 56 from outside of the casing section 21.

A second casing section 60 is secured at one end to the casing section 21 while its other end is mounted on and supported by the hub 19 of the plate 20. In operation the casings are preferably partially filled with a lubricating oil so that the gearing may run in oil, suitable seals being provided to prevent escape of the lubricant as is common practice.

As above explained, the gears 27 and 33 are always in mesh with the pinions 29 and there is always a driving connection, either low speed or high speed, between the drive shaft 15 and the driven shaft 16. When the friction clutch plates 45 and 46 are pressed into engagement by the pressure ring 48, pins 49, operating ring 50 and clutch fingers 51 through shifting of the sleeve 53 to the position shown in Fig. 1, the said clutch establishes a direct drive connection from the drive shaft 15 to the spider 32 and through it to the driven shaft 16. The driven shaft will thus be rotated at the same speed as the drive shaft 15 and during such engagement of the friction clutch the gears 27 and 33 together with the pinions 29 and the spider 32 will rotate as a unit without any relative motion occurring between either of the gears and the pinions. This is possible by reason of the one-way overrunning brake embodied in the hub 34 which carries the gear 33.

When the cone sleeve 53 is shifted toward the right, as viewed in Fig. 1, by means of the operating lever 56 thereby disengaging the plates 45 and 46 of the friction clutch, the load upon driven shaft 16 will tend to retard rotation of the spider 32 and this will produce relative movement between the pinions 29 carried by the said spider and the driving gear 27 carried by the driving shaft 15, the latter shaft, of course, still rotating at normal speed. This tendency of the pinions 29 to rotate upon their axes will tend to produce rotation of the gear 33 in a direction opposite to that in which the gear 27 is rotating, but this tendency on the part of the gear 33 to thus rotate will bring into play the balls or rollers 39 of the overrunning brake which will clutch the hub 34 of the gear 33 to the stationary brake annulus 36 and thereby prevent such reverse rotation of gear 33. This gear will therefore be held stationary and will act as a stationary track upon which the pinions 29 may be driven by the driving gear 27, but as will be readily understood the rotation of the said pinions 29 and the spider 32 and consequently the driven shaft 16, will be at a lower speed than that of the driving shaft and gear. If the gears 27 and 33 be of equal diameters the speed at which the spider 32 and driven shaft 16 will be rotated under these conditions will be one-half of that of the driving gear and shaft. Of course various gear ratios may be attained by varying the relative diameters of the gears 27 and 33.

It will be noted that, as above stated, there is always a driving connection between the driving shaft 15 and the driven shaft 16 whether the friction clutch 45, 46 be engaged or not, and that therefore there is never any period of time during which the load upon shaft 16 may come to a state of rest. This is true whether the transmission be in low gear and the change be made to high, or whether the gearing be in high and the change is to be made to low.

In Fig. 4 there is illustrated more or less diagrammatically the application of the present change speed gearing to a truck mixer of the type illustrated in the said Ball Patent No. 1,781,965. Here the mixer drum 75 is adapted to be driven by a motor enclosed within a housing 76 through a chain and sprocket drive 77 and a reversing gear contained within a housing 78. The change speed gearing of the present invention is shown as being interposed between the fly-wheel housing 23 of the driving motor and the housing 78 of the reversing gear.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In a constant drive change-speed power transmission gearing, a supporting structure; a driven shaft extending completely through and journaled in said structure; a tubular drive shaft journaled on and wholly supported by one end portion of said driven shaft; a spider rigidly carried by another portion of the driven shaft, adjacent the inner end of the drive shaft; a pair of bevel gears disposed one to either side of said spider, one of said gears being rigidly carried by said tubular drive shaft and the second gear being journaled on the driven shaft adjacent the spider; a plurality of bevel pinions mounted radially upon said spider, each meshing with both of said gears; a friction clutch arranged to make and break a driving connection between said spider and one of said gears; and a one-way brake interposed between the second mentioned gear and a portion of the supporting structure.

2. In a constant drive change-speed power transmission gearing, a supporting structure and housing; a driven shaft extending therethrough and journaled therein; a tubular drive shaft surrounding and wholly journaled upon and supported by one end portion of said driven shaft; a spider rigidly carried by another portion of said driven shaft, adjacent the inner end of the drive shaft; a pair of bevel gears disposed one to either side of said spider, one of said gears being rigidly carried by the inner end portion of said drive shaft and the second of said gears being journaled on the driven shaft adjacent the spider and having a closely adjacent hub portion within the supporting structure and housing formed to constitute one element of a one-way roller brake; a plurality of bevel pinions mounted radially upon said spider, each meshing with both of said gears; a friction clutch arranged to make and break a driving connection between said spider and one of said gears; a brake element within and rigid with the supporting structure, disposed in co-operative relation to the companion element formed on the second gear; and rollers disposed between said brake elements.

3. In a constant drive change-speeed power transmission gearing, a supporting structure; a driven shaft journaled in said structure; a tubular drive shaft wholly journaled upon and supported by one end portion of said driven shaft; a spider rigidly mounted on another portion of the driven shaft, adjacent the inner end of the drive shaft; a pair of bevel gears disposed one to either side of and facing said spider, one of said gears being rigidly carried by the inner end portion of said drive shaft and the second of said gears being journaled on the driven shaft adjacent the spider; a plurality of bevel pinions mounted radially upon said spider, each meshing with both of said gears; a friction clutch housed between the spider and one of said gears, arranged to make and break a driving connection between them; means disposed adjacent said last mentioned gear and including a member operating therethrough, for controlling said clutch; and a one-way brake interposed between said second gear and a portion of the supporting structure.

HANS A. HANSON.